(12) United States Patent
Chen et al.

(10) Patent No.: US 12,112,492 B2
(45) Date of Patent: Oct. 8, 2024

(54) THREE-DIMENSIONAL SENSING DEVICE AND SPECULAR REFLECTION OBJECT DETECTION METHOD

(71) Applicant: HIMAX TECHNOLOGIES LIMITED, Tainan (TW)

(72) Inventors: Wu-Feng Chen, Tainan (TW); Pen-Hsin Chen, Tainan (TW); Cheng-Che Tsai, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 448 days.

(21) Appl. No.: 17/691,133

(22) Filed: Mar. 10, 2022

(65) Prior Publication Data
US 2023/0289985 A1 Sep. 14, 2023

(51) Int. Cl.
*G06T 7/44* (2017.01)
*G06T 7/514* (2017.01)

(52) U.S. Cl.
CPC .............. *G06T 7/44* (2017.01); *G06T 7/514* (2017.01); *G06T 2207/10052* (2013.01); *G06T 2207/20021* (2013.01); *G06T 2207/20221* (2013.01)

(58) Field of Classification Search
CPC . G06T 7/44; G06T 7/514; G06T 2207/10052; G06T 2207/20021; G06T 2207/20221; G06T 2207/10152
See application file for complete search history.

(56) References Cited

U.S. PATENT DOCUMENTS 9,769,392 B1* 9/2017 Colburn ................. G03B 15/05
2023/0143446 A1* 5/2023 Schönlieb-Stalzer ........................ G06V 10/147
345/426

* cited by examiner

Primary Examiner — Matthew C Bella
Assistant Examiner — Janice E. Vaz
(74) Attorney, Agent, or Firm — JCIPRNET

(57) ABSTRACT

A three-dimensional (3D) sensing device is configured to sense an object. The 3D sensing device includes a flood light source, a structured light source, an image sensor, and a controller. The controller is configured to perform: commanding the flood light source and the structured light source to emit a flood light and a structured light in sequence; commanding the image sensor to sense a first reflective light and a second reflective light in sequence, so as to obtain a first image frame and a second image frame; combining the first image frame and the second image frame into a determination frame; and determining that the object is a specular reflection object in response to determining that the determination frame has at least two spots having gray levels satisfying a predetermined condition. A specular reflection object detection method is also provided.

18 Claims, 6 Drawing Sheets

THREE-DIMENSIONAL SENSING DEVICE AND SPECULAR REFLECTION OBJECT DETECTION METHOD

BACKGROUND

Technical Field

The disclosure generally relates to a sensing device and a detection method and, in particular, to a three-dimensional (3D) sensing device and a specular reflection object detection method.

Description of Related Art

Recently, 3D sensing is widely applied to face recognition, simultaneous localization and mapping (SLAM), etc. Generally, 3D sensing can be classified into time-of-flight (ToF) sensing, dual camera, and structured light sensing. In the structured light sensing, a structured light is projected onto an object to form light pattern on the object, and a camera is configured to photograph the light pattern. By calculating the shifts of the points of the light pattern, distances between the points of the light pattern and the camera are obtained.

However, if the object is made of glass, since the structured light will pass through the transparent object, the light pattern cannot be formed on the object. As a result, the distance of the object cannot be calculated, so that the system cannot know that there is glass in front. Consequently, when the 3D sensing is applied to an artificial intelligence (AI) robot or a sweeping robot, some collision may occur.

SUMMARY

Accordingly, the disclosure is directed to a 3D sensing device, which can detect a specular reflection object.

The disclosure is directed to a specular reflection object detection method, which can detect a specular reflection object.

An embodiment of the disclosure provides a three-dimensional (3D) sensing device configured to sense an object. The 3D sensing device includes a flood light source, a structured light source, an image sensor, and a controller. The flood light source is configured to emit a flood light to the object, wherein the object reflects the flood light into a first reflective light. The structured light source is configured to emit a structured light to the object, wherein the object reflects the structured light into a second reflective light. The image sensor is configured to sense the first reflective light and the second reflective light. The controller is electrically connected to the flood light source, the structured light, and the image sensor, and configured to perform: commanding the flood light source and the structured light source to emit the flood light and the structured light in sequence; commanding the image sensor to sense the first reflective light and the second reflective light in sequence, so as to obtain a first image frame corresponding to the first reflective light and a second image frame corresponding to the second reflective light; combining the first image frame and the second image frame into a determination frame; and determining that the object is a specular reflection object in response to determining that the determination frame has at least two spots having gray levels satisfying a predetermined condition.

An embodiment of the disclosure provides a specular reflection object detection method including: commanding a flood light source to emit a flood light and a structured light source to emit a structured light in sequence; commanding an image sensor to sense a first reflective light formed by an object reflecting the flood light and a second reflective light formed by the object reflecting the structured light in sequence in sequence, so as to obtain a first image frame corresponding to the first reflective light and a second image frame corresponding to the second reflective light; combining the first image frame and the second image frame into a determination frame; and determining that the object is a specular reflection object in response to determining that the determination frame has at least two spots having gray levels satisfying a predetermined condition.

In the 3D sensing device and the specular reflection object detection method according to embodiment of the disclosure, the first image frame corresponding to the flood light and the second image frame corresponding to the structured light are combined into the determination frame, and that the object is a specular reflection object is determined in response to determining that the determination frame has at least two spots having gray levels satisfying a predetermined condition. Therefore, the 3D sensing device and the specular reflection object detection method can find a specular reflection object in front. As a result, when the 3D sensing device and the specular reflection object detection method are applied to a device such as an AI robot, a sweeping robot, a drone, etc., collision with a specular reflection object, e.g. a transparent object, may be prevented.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
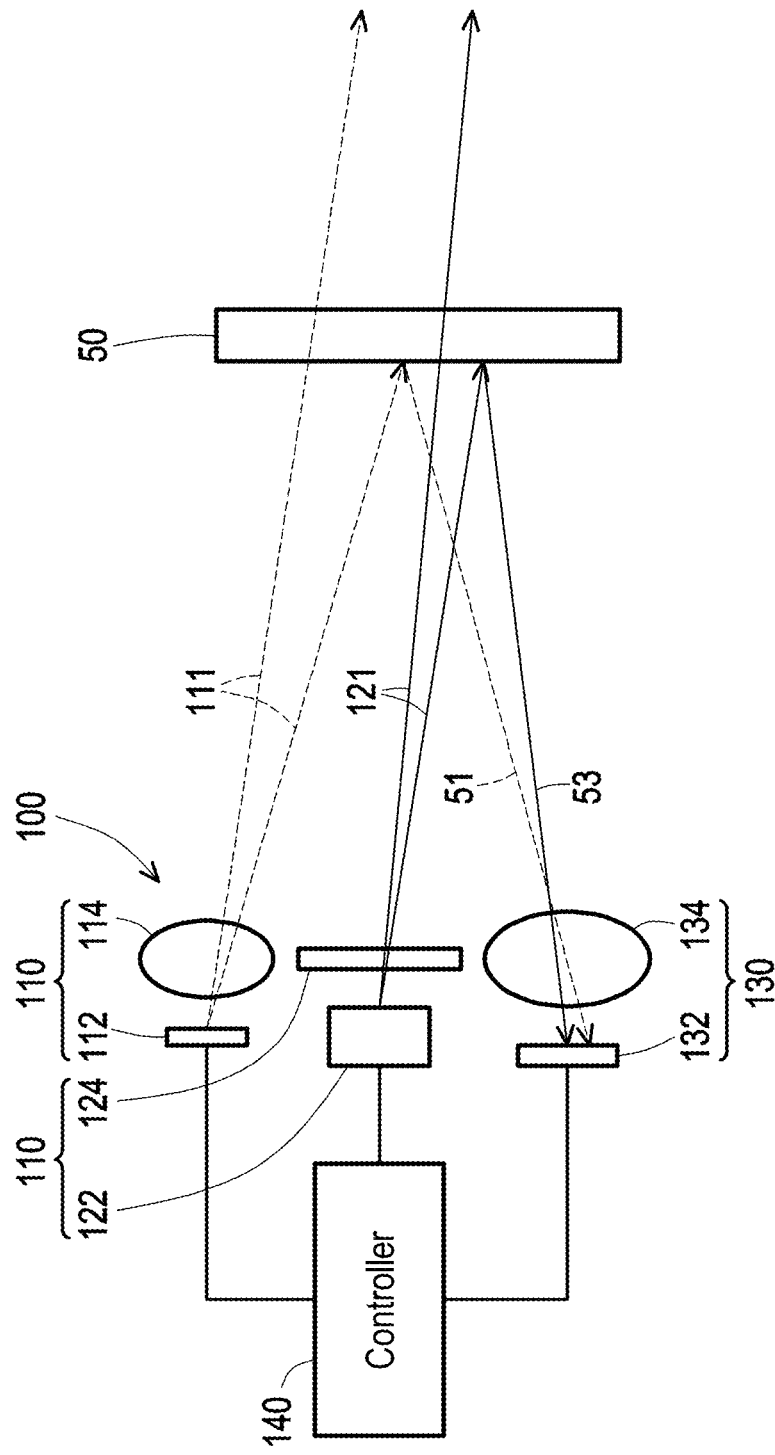
FIG. 1 is a schematic view of a three-dimensional (3D) sensing device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic view of a three-dimensional (3D) sensing device according to an embodiment of the disclosure. Referring to FIG. 1, the 3D sensing device 100 in this embodiment is configured to sense an object 50. The 3D sensing device 100 includes a flood light source 110, a structured light source 120, an image sensor 132, and a controller 140. The flood light source 110 is configured to emit a flood light 111 to the object 50, wherein the object 50 reflects the flood light 111 into a first reflective light 51. The structured light source 120 is configured to emit a structured light 121 to the object 50, wherein the object 50 reflects the structured light 121 into a second reflective light 53. The image sensor 132 is configured to sense the first reflective light 51 and the second reflective light 53.

In this embodiment, the flood light 111 may uniformly irradiate the object 50. The flood light source 110 may include a light-emitting element 112 and a lens 114. The light-emitting element 112 is, for example, a light-emitting diode (LED) or any other appropriate light-emitting device. The light-emitting element 112 is configured to emit the flood light 111, and the lens 114 is disposed on a path of the flood light 111 and configured to transmit the flood light 111 to the object 50. If the object 50 is a diffuse reflection object that diffusely reflects the flood light 111, a relatively uniform illumination distribution may be formed on the object 50.

In this embodiment, the structured light source 120 includes a laser emitter 122 and a diffractive optical element (DOE) 124. The laser emitter 122 is configured to emit a laser beam. The DOE 124 is disposed on a path of the laser beam, and configured to diffract the laser beam into the structured light 121. The laser emitter 122 is, for example, a laser diode, a vertical-cavity surface-emitting laser (VCSEL), or any other appropriate laser. If the object 50 is a diffuse reflection object, the structured light 121 may form a light pattern, e.g. a light dot array, on the object 50.

The controller is electrically connected to the flood light source, the structured light, and the image sensor. A camera 130 may include the image sensor 132 and a lens 134 disposed in front of the image sensor 132. If the object 50 is a diffuse reflection object, when the flood light 111 irradiates the object 50, the lens 134 receives the first reflective light 51 and forms an image of the object 50 on the image sensor 132. As a result, the camera 130 can capture the image of the profile of the object 50, and the controller may recognize the object 50. If the object 50 is a diffuse reflection object, when the structured light 121 irradiates the object 50, a light pattern, e.g. a light dot array, is formed on the object 50, and the lens 134 receives the second reflective light 53 and forms an image of the light pattern, e.g. a light dot array, on the image sensor. The profile of the object 50 may cause distortion of the light pattern or shifts of light dots of the light dot array. The controller 140 may calculate the distortion of the light pattern or the shifts of the light dots of the light pattern, so as to obtain distances between the positions of the light pattern and the camera. Therefore, the 3D sensing device 100 can perform 3D sensing in this way.

Figure 2A:
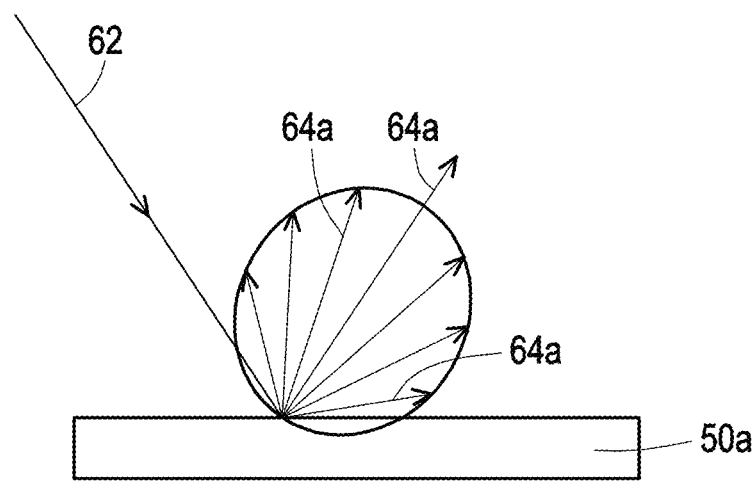
FIG. 2A shows diffuse reflection.
Figure 2B:
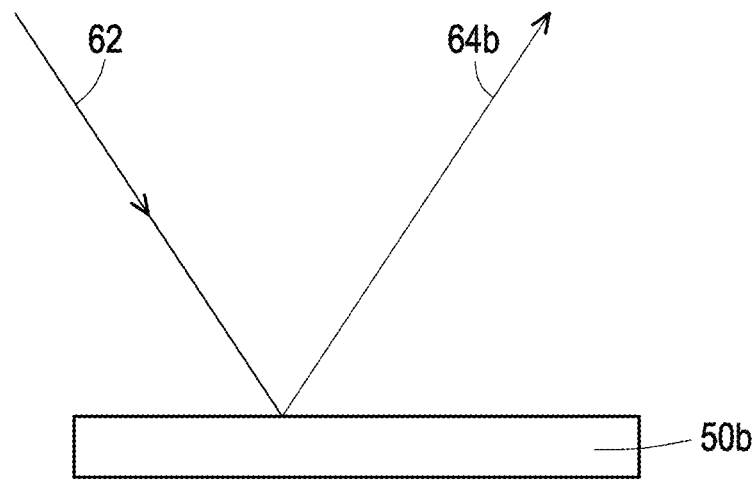
FIG. 2B shows specular reflection.

FIG. 2A shows diffuse reflection, and FIG. 2B shows specular reflection. Referring to FIG. 2A, when a light 62 irradiate a diffuse reflection object 50a, the diffuse reflection object 50a diffusely reflects the light 62 into rays 64a with different directions. However, referring to FIG. 2B, when a light 62 irradiate a specular reflection object 50b, the specular reflection object 50b specularly reflects the light into a reflective light 64b with a single specific direction. As a result, referring to FIG. 1, if the object 50 is a specular reflection object, the first reflective light 51 is along a single direction, and the second reflective light 53 is along a single direction. Consequently, the first reflective light 51 forms a single spot P1 in the image frame captured by the image sensor 132, as shown in FIG. 3A, and the second reflective light 53 forms a single spot P2 in the image frame captured by the image sensor 132, as shown in FIG. 3B.

Figure 3A:
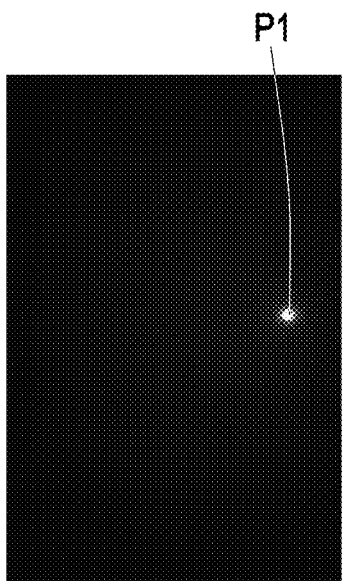
FIG. 3A shows a first image frame obtained by the image sensor in FIG. 1 capturing the first reflective light when the object is a specular reflection object.

FIG. 3A shows a first image frame obtained by the image sensor in FIG. 1 capturing the first reflective light when the object is a specular reflection object. FIG. 3B shows a second image frame obtained by the image sensor in FIG. 1 capturing the second reflective light when the object is a specular reflection object. FIG. 3C shows a determination frame obtained by combining the first image frame in FIG. 3A and the second image frame in FIG. 3B. FIG. 4 is a flowchart of a specular reflection object detection method according to an embodiment of the disclosure. Referring to FIG. 1 and FIG. 4, the specular reflection object detection method in this embodiment may be performed by the 3D sensing device 100 shown in FIG. 1. The controller 140 may be configured to perform the following steps, and the specular reflection object detection method in this embodiment may include the following steps. First, step S110 may be executed, in which the controller 140 enters a specular reflection object detection mode. In this mode, the auto-exposure gain of the image frame obtained by the image sensor 132 is low. For example, in an embodiment, the auto-exposure gain in the specular reflection object detection mode is set to be 1, but the disclosure is not limited thereto.

Figure 3B:
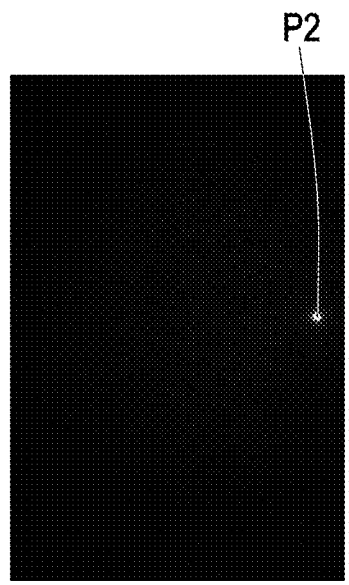
FIG. 3B shows a second image frame obtained by the image sensor in FIG. 1 capturing the second reflective light when the object is a specular reflection object.
Figure 3C:
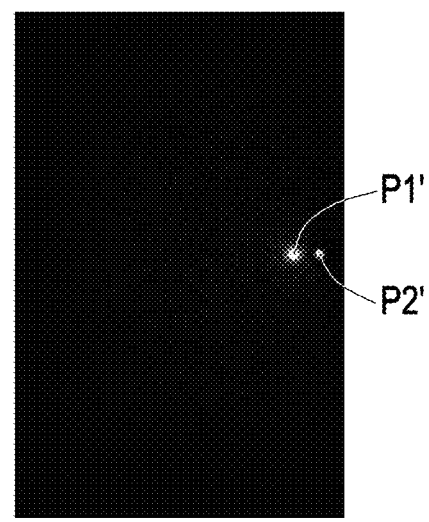
FIG. 3C shows a determination frame obtained by combining the first image frame in FIG. 3A and the second image frame in FIG. 3B.
Figure 4:
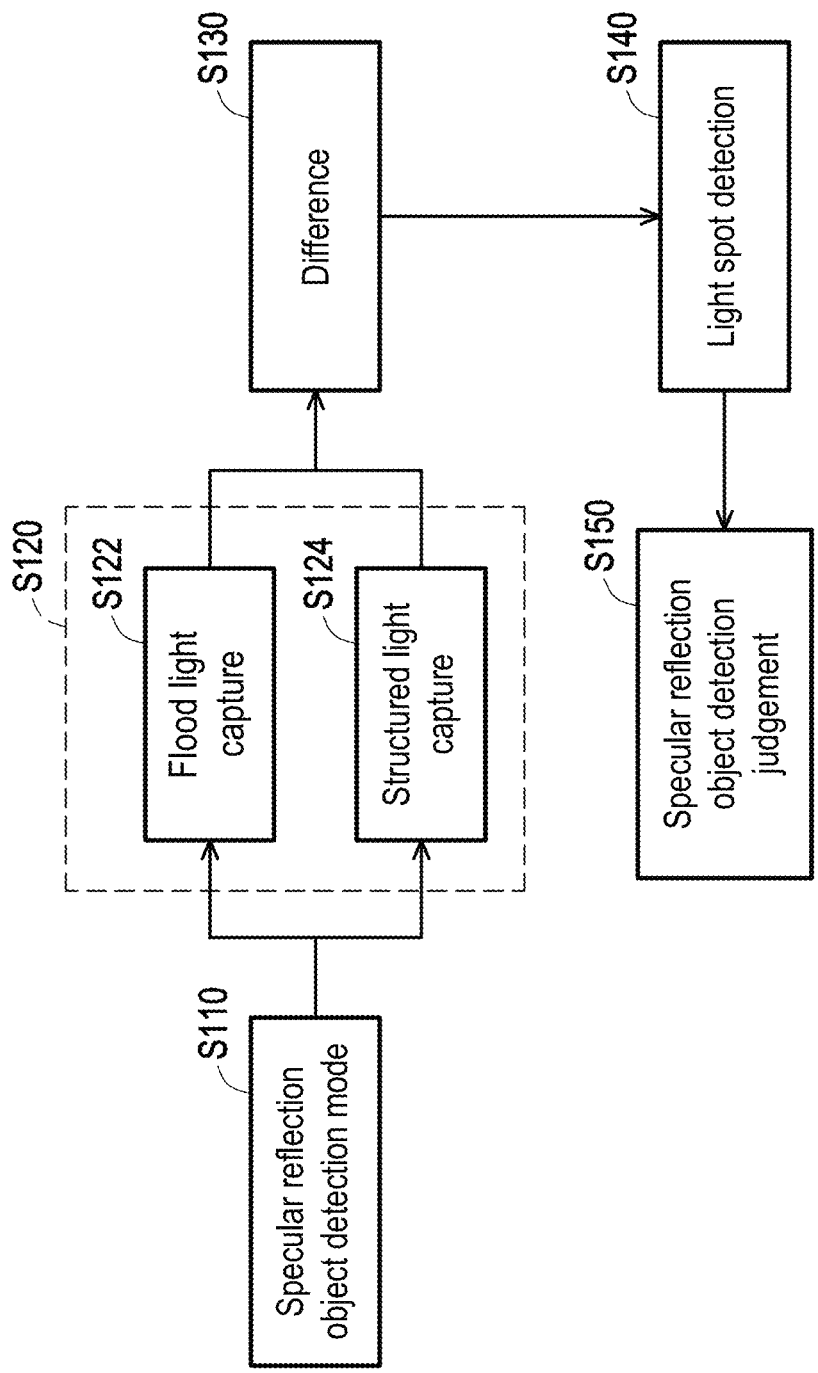
FIG. 4 is a flowchart of a specular reflection object detection method according to an embodiment of the disclosure.

Next, step S120 is executed, in which the flood light source 110 and the structured light source 120 are commanded by the controller 140 to emit the flood light 111 and the structured light 121 in sequence, and the image sensor 132 is commanded by the controller 140 to sense the first reflective light 51 and the second reflective light 53 in sequence, so as to obtain a first image frame (as shown in FIG. 3A) corresponding to the first reflective light 51 and a second image frame (as shown in FIG. 3B) corresponding to the second reflective light 53.

In this embodiment, step S120 may include sub-step S122 and sub-step 124. In sub-step S122, the flood light source 110 is commanded by the controller 140 to emit the flood light 111, and the image sensor 132 is commanded by the controller 140 to sense the first reflective light 51, so as to obtain a first image frame (as shown in FIG. 3A) corresponding to the first reflective light 51. In sub-step S124, the structured light source 120 is commanded by the controller 140 to emit the structured light 121, and the image sensor 132 is commanded by the controller 140 to sense the second reflective light 53, so as to obtain a second image frame (as shown in FIG. 3B) corresponding to the second reflective light 53. In this embodiment, sub-step S122 is executed first, and then the sub-step S124 is executed.

Then, step S130 is executed, in which the first image frame (as shown in FIG. 3A) and the second image frame (as shown in FIG. 3B) is combined by the controller 140 into a determination frame (as shown in FIG. 3C). For example, in step S130, difference values between gray levels of pixels of the first image frame and gray levels of corresponding pixels of the second image frame are calculated by the controller 140. Specifically, gray levels of pixels of the first image frame are subtracted from gray levels of corresponding pixels of the second image frame, or gray levels of pixels of the second image frame are subtracted from gray levels of corresponding pixels of the first image frame, so as to obtain the difference values. Then, absolute values of the difference values are calculated by the controller 140 to respectively form gray levels of pixels of the determination frame, e.g. the gray levels of the pixels of FIG. 3C.

After that, that the object 50 is a specular reflection object (i.e. that there is a specular reflection object in front) is determined by the controller 140 (step S150) in response to the controller 140 determining that the determination frame has at least two spots (e.g. the spots P1' and P2' in FIG. 3C) having gray levels satisfying a predetermined condition (step S140). In this embodiment, the predetermined condition is that a gray level of the at least two spots is greater than a first threshold value, for example, 200. In this embodiment, the gray levels of pixels of the image sensor 132 range from 0 to 255.

Figure 5:
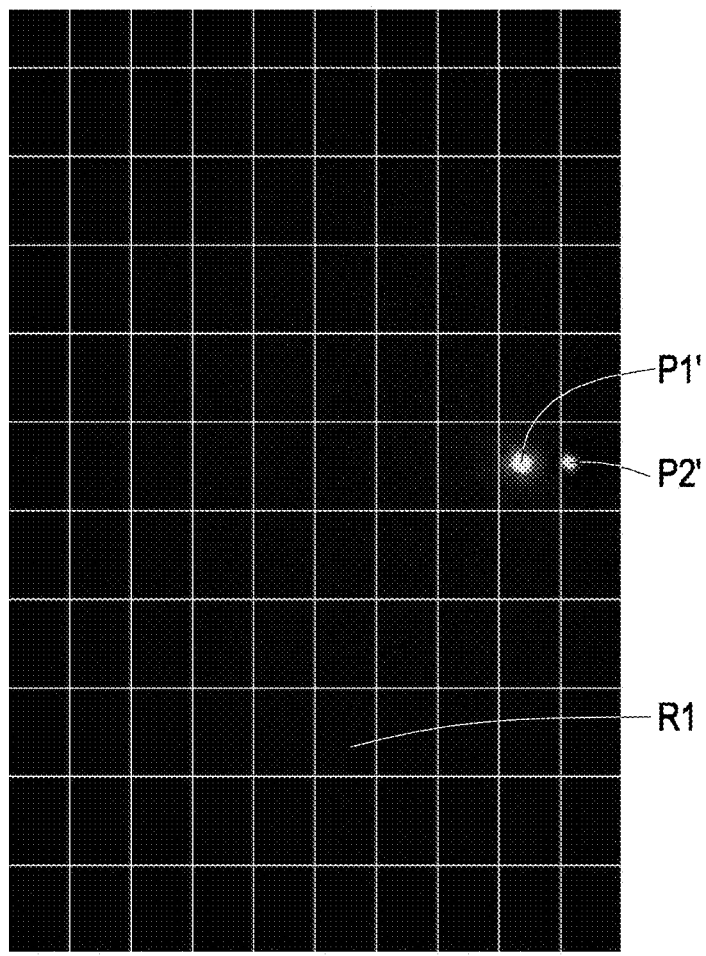
FIG. 5 shows the determination frame in FIG. 3C being divided into a plurality of regions.

Specifically, in step S140, the determination frame is divided into a plurality of regions R1, as shown in FIG. 5. Then, regions R1 having an average of gray levels less than a second threshold value are found. The second threshold value may be less than the first threshold value. In this embodiment, the second threshold value is, for example, 50. After that, that the determination frame has at least two spots having gray levels satisfying the predetermined condition is determined in response to the controller 140 determining the number of spots having gray levels greater than the first threshold value is greater than or equal to a third threshold value. In this embodiment, the third threshold value is, for example, 2. Moreover, in this embodiment, the regions R1 are arranged in a rectangular array.

In this embodiment, the at least two spots are contributed by the specular reflection object specularly reflecting the flood light 111 and the structured light 121. The specular reflection object may include a transparent object. For example, a material of the transparent object includes glass. For instance, when the object 50 is made of glass, the object 50 may specularly reflect the flood light 111 and the structured light 121.

Figures 6A, 6B, 6C:
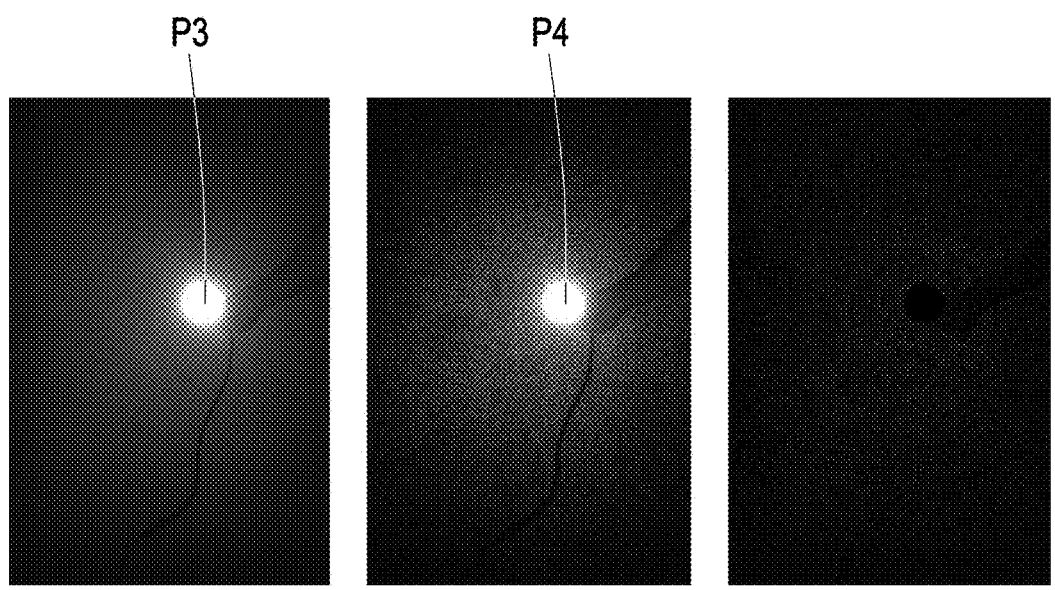
FIG. 6A shows a first image frame obtained by the image sensor in FIG. 1 when the object is a light source.
FIG. 6B shows a second image frame obtained by the image sensor in FIG. 1 when the object is a light source.
FIG. 6C shows a determination frame obtained by combining the first image frame in FIG. 6A and the second image frame in FIG. 6B.

If the object 50 is a light source, the light spot P3 in the first frame (as shown in FIG. 6A) and the light spot P4 in the second frame (as shown in FIG. 6B) have the same position and size. Therefore, the difference values in the region of the light spot P3 or P4 are zero, so that the determination frame (as shown in FIG. 6C) does not have at least two spots having gray levels satisfying the predetermined condition. Consequently, the controller will not determine that there is a specular reflection object in front. On the other hand, if the object 50 is a specular reflection object, since the flood light source 110 and the structured light source 120 are disposed at difference, so that the spot P1 in the first image frame and the spot P2 in the second image frame respectively have different positions in the image frame. Therefore, difference values between gray levels of pixels of the first image frame and gray levels of corresponding pixels of the second image frame have large absolute values in the positions of the spot P1 and the spot P2. Consequently, two spots P1' and P2' occur in the determination frame as shown in FIG. 3C, so that the controller 140 may determine that there is a specular reflection object in front. If the object 50 is a diffuse reflection object or the is no object in front, the predetermined condition of the determination frame will not satisfied, so that the controller 140 determines that there is no specular reflection object in front.

Moreover, in this embodiment, in step S110, since the auto-exposure gain in the specular reflection object detection mode is low, for example, being set to be 1, so that the light pattern formed by the structured light 121 irradiating a diffuse reflection object is not obvious and can be ignored in comparison with the spot P1 and P2 due to specular reflection and being over-exposed and having high gray level. As a result, the specular reflection object detection mode of step S110 is suitable for specular reflection object detection.

In the 3D sensing device 100 and the specular reflection object detection method in this embodiment, the first image frame corresponding to the flood light 111 and the second image frame corresponding to the structured light 121 are combined into the determination frame, and that the object 50 is a specular reflection object is determined in response to determining that the determination frame has at least two spots having gray levels satisfying the predetermined condition. Therefore, the 3D sensing device 100 and the specular reflection object detection method can find a specular reflection object in front. As a result, when the 3D sensing device 100 and the specular reflection object detection method are applied to a device such as an AI robot, a sweeping robot, a drone, etc., collision with a specular reflection object, e.g. a transparent object, may be prevented. Moreover, the 3D sensing device 100 may detect a specular reflection object by the optical system thereof without adopting an additional sensor of other types, e.g. an ultrasonic sensor, so that the 3D sensing device 100 may have a lower cost.

In conclusion, in the 3D sensing device and the specular reflection object detection method according to embodiment of the disclosure, the first image frame corresponding to the flood light and the second image frame corresponding to the structured light are combined into the determination frame, and that the object is a specular reflection object is determined in response to determining that the determination frame has at least two spots having gray levels satisfying a predetermined condition. Therefore, the 3D sensing device and the specular reflection object detection method can find a specular reflection object in front. As a result, when the 3D sensing device and the specular reflection object detection method are applied to a device such as an AI robot, a sweeping robot, a drone, etc., collision with a specular reflection object, e.g. a transparent object, may be prevented.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional (3D) sensing device configured to sense an object, the 3D sensing device comprising:
   a flood light source configured to emit a flood light to the object, wherein the object reflects the flood light into a first reflective light;
   a structured light source configured to emit a structured light to the object, wherein the object reflects the structured light into a second reflective light;
   an image sensor configured to sense the first reflective light and the second reflective light; and
   a controller electrically connected to the flood light source, the structured light, and the image sensor, and configured to perform:

commanding the flood light source and the structured light source to emit the flood light and the structured light in sequence;

commanding the image sensor to sense the first reflective light and the second reflective light in sequence, so as to obtain a first image frame corresponding to the first reflective light and a second image frame corresponding to the second reflective light;

combining the first image frame and the second image frame into a determination frame; and determining that the object is a specular reflection object in response to determining that the determination frame has at least two spots having gray levels satisfying a predetermined condition.

2. The 3D sensing device according to claim 1, wherein combing the first image frame and the second image frame into the determination frame comprises:

calculating difference values between gray levels of pixels of the first image frame and gray levels of corresponding pixels of the second image frame; and calculating absolute values of the difference values to respectively form gray levels of pixels of the determination frame.

3. The 3D sensing device according to claim 1, wherein the predetermined condition is that a gray level is greater than a first threshold value.

4. The 3D sensing device according to claim 3, wherein determining that the determination frame has at least two spots having gray levels satisfying the predetermined condition comprises:

dividing the determination frame into a plurality of regions;

finding regions having an average of gray levels less than a second threshold value; and determining that the determination frame has at least two spots having gray levels satisfying the predetermined condition in response to determining the number of spots having gray levels greater than the first threshold value is greater than or equal to a third threshold value.

5. The 3D sensing device according to claim 4, wherein the third threshold value is 2.

6. The 3D sensing device according to claim 4, wherein the regions are arranged in a rectangular array.

7. The 3D sensing device according to claim 1, wherein the at least two spots are contributed by the specular reflection object specularly reflecting the flood light and the structured light.

8. The 3D sensing device according to claim 7, wherein the specular reflection object comprises a transparent object.

9. The 3D sensing device according to claim 8, wherein a material of the transparent object comprises glass.

10. A specular reflection object detection method comprising:

commanding a flood light source to emit a flood light and a structured light source to emit a structured light in sequence;

commanding an image sensor to sense a first reflective light formed by an object reflecting the flood light and a second reflective light formed by the object reflecting the structured light in sequence in sequence, so as to obtain a first image frame corresponding to the first reflective light and a second image frame corresponding to the second reflective light;

combining the first image frame and the second image frame into a determination frame; and determining that the object is a specular reflection object in response to determining that the determination frame has at least two spots having gray levels satisfying a predetermined condition.

11. The specular reflection object detection method according to claim 10, wherein combing the first image frame and the second image frame into the determination frame comprises:

calculating difference values between gray levels of pixels of the first image frame and gray levels of corresponding pixels of the second image frame; and calculating absolute values of the difference values to respectively form gray levels of pixels of the determination frame.

12. The specular reflection object detection method according to claim 10, wherein the predetermined condition is that a gray level is greater than a first threshold value.

13. The specular reflection object detection method according to claim 12, wherein determining that the determination frame has at least two spots having gray levels satisfying the predetermined condition comprises:

dividing the determination frame into a plurality of regions;

finding regions having an average of gray levels less than a second threshold value; and determining that the determination frame has at least two spots having gray levels satisfying the predetermined condition in response to determining the number of spots having gray levels greater than the first threshold value is greater than or equal to a third threshold value.

14. The specular reflection object detection method according to claim 13, wherein the third threshold value is 2.

15. The specular reflection object detection method according to claim 13, wherein the regions are arranged in a rectangular array.

16. The specular reflection object detection method according to claim 10, wherein the at least two spots are contributed by the specular reflection object specularly reflecting the flood light and the structured light.

17. The specular reflection object detection method according to claim 16, wherein the specular reflection object comprises a transparent object.

18. The specular reflection object detection method according to claim 17, wherein a material of the transparent object comprises glass.

* * * * *